W. M. SMITH.
CLOTHES LINE PROP.
APPLICATION FILED OCT. 3, 1913.
1,118,821.
Patented Nov. 24, 1914.
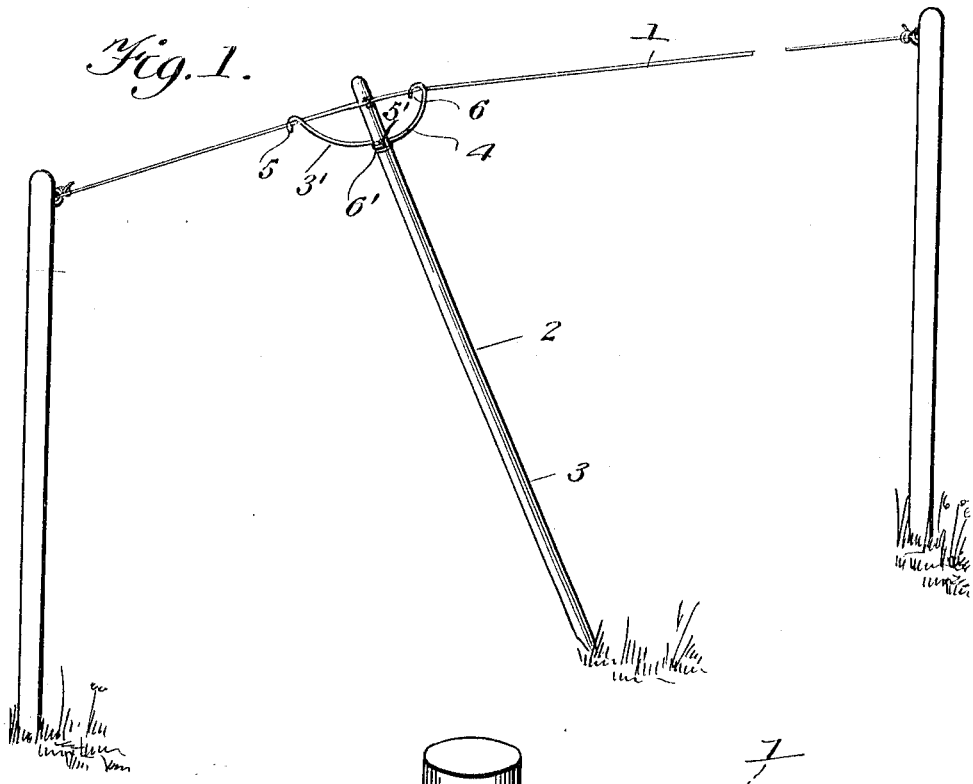
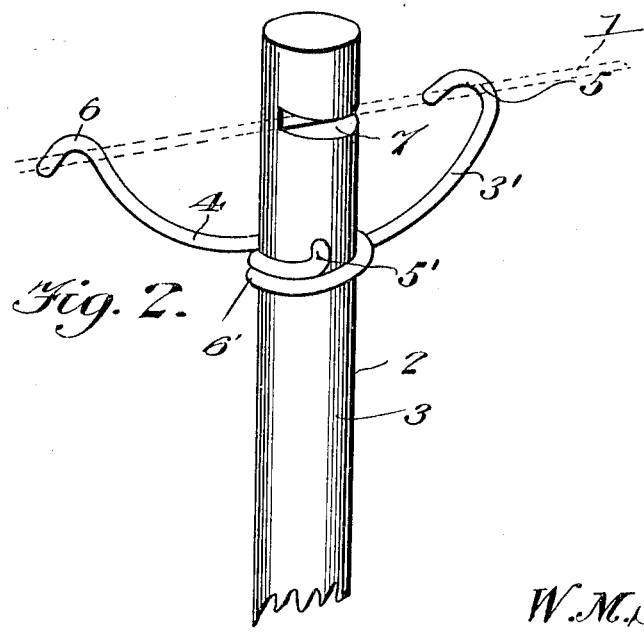
Witnesses
F. R. Moran
Inventor
W. M. Smith
By Victor J. Evans
Attorney

UNITED STATES PATENT OFFICE.

WILLIAM M. SMITH, OF WOODWARD, OKLAHOMA, ASSIGNOR OF ONE-HALF TO CHARLES H. MARTIN, OF WOODWARD, OKLAHOMA.

CLOTHES-LINE PROP.

1,118,821.  Specification of Letters Patent.  Patented Nov. 24, 1914.

Application filed October 3, 1913. Serial No. 793,242.

*To all whom it may concern:*

Be it known that I, WILLIAM M. SMITH, a citizen of the United States, residing at Woodward, in the county of Woodward and State of Oklahoma, have invented new and useful Improvements in Clothes-Line Props, of which the following is a specification.

The present invention relates to improvements in props for clothes lines, the object being to provide a prop which when engaging with the line cannot be accidentally displaced, but which at the same time may be drawn upon the line to a desired position for stretching the line.

The invention further consists in the novel construction, combination and arrangement of parts set forth in the following specification and falling within the scope of the appended claim.

In the drawing: Figure 1 is a perspective view illustrating my improved prop in applied position upon a clothes line, and Fig. 2 is an enlarged detail perspective view of the upper or engaging portion of the prop.

Referring now to the drawing in detail, 1 designates a clothes line which is supported upon suitable posts and which is adapted to be stretched by my improved prop 2. The prop 2 comprises an ordinary pole 3 which is of a length greater than the height of the line 1 from the ground. The prop may have its lower end pointed so that the same will readily enter the ground, and its opposite end is provided with a pair of oppositely disposed upwardly curved arms 3' and 4 which terminate in downturned hooks 5 and 6. In the showing of the drawings, these arms and hooks are formed from a single strip of wire, the same being centrally passed through an opening 5' in the post and its strands passing through the opening looped around the post, as indicated by the numerals 6'.

In arranging the device upon a clothes line, the hook of one of the curved arms is first brought into engagement with the line. The portion of the post projecting between the arms is forced into engagement with the line to bring its second arm upon the line. The post is then elevated at its base and forced within the ground. The arms are arranged upon one of the faces of the post, while the second or opposite face of the post is contacted by the line. Thus it will be noted that a binding effect is produced between the arms and the prop, so that the said prop cannot be rotated by contact of the wind with the clothes upon the line.

When the prop is lifted out of the ground to permit of the line becoming taut, the prop may be slid, without removing the same from the line, to any desired position upon the line, as will be readily understood.

The prop 2 is preferably provided with a notch 7 which is arranged longitudinally of the hooks 5 and 6 and which opens to the rear of the said hooked ends 5 and 6 of the curved arms 3' and 4, and the said hooks are adapted when engaging the clothes line, to force the said line into the notch 7 which will effectively prevent the pole from becoming accidentally loosened from the line.

Having thus described the invention, what I claim is:

A clothes prop including a post having one of its faces adjacent one of its ends provided with a transverse notch, the said post having an opening disposed below the notch and arranged centrally of the post and at an angle to the notch, a resilient wire passed through the opening and wound around the post and extended laterally in opposite directions over the face of the post opposite that provided with the notch to provide upwardly curved arms, and the said arms having their ends bent outwardly of the post away from the notch to provide hooks.

In testimony whereof I affix my signature in presence of two witnesses.

WILLIAM M. SMITH.

Witnesses:
EBEN SHUCHART,
L. ASHFORD.

Copies of this patent may be obtained for five cents each, by addressing the "Commissioner of Patents, Washington, D. C."